(12) United States Patent
Thomasson et al.

(10) Patent No.: US 7,740,951 B2
(45) Date of Patent: Jun. 22, 2010

(54) MULTILAYERED POLYMERIC STRUCTURE AND METHODS

(75) Inventors: Tara Thomasson, Burleson, TX (US); Kyle Davis, Arlington, TX (US); Marta Drewniak, Carrollton, TX (US)

(73) Assignee: LyondellBasell Advanced Polyolefins USA Inc., Mansfield, TX (US)

( * ) Notice: Subject to any disclaimer, the term of this patent is extended or adjusted under 35 U.S.C. 154(b) by 637 days.

(21) Appl. No.: 11/734,159

(22) Filed: Apr. 11, 2007

(65) Prior Publication Data

US 2008/0254308 A1 Oct. 16, 2008

(51) Int. Cl.
*B32B 27/32* (2006.01)
*B32B 27/08* (2006.01)
*C08G 73/02* (2006.01)

(52) U.S. Cl. .................. 428/515; 428/220; 428/332; 525/540

(58) Field of Classification Search .............. None
See application file for complete search history.

(56) References Cited

U.S. PATENT DOCUMENTS

| | | | |
|---|---|---|---|
| 3,318,976 A | 5/1967 | Short | 525/247 |
| 3,345,196 A * | 10/1967 | Goldbeck | 427/264 |
| 3,595,942 A | 7/1971 | Wald et al. | 525/332.9 |
| 4,588,648 A | 5/1986 | Krueger et al. | 428/475.8 |
| 4,868,057 A | 9/1989 | Himes | 428/216 |
| 4,898,784 A | 2/1990 | Sanders et al. | 428/215 |
| 4,939,009 A | 7/1990 | Beavers et al. | 526/160 |
| 5,055,346 A | 10/1991 | Rohrbacher | 428/344 |
| 5,306,548 A | 4/1994 | Zabrocki et al. | 525/240 |
| 5,324,800 A | 6/1994 | Welborn et al. | 428/412 |
| 5,358,783 A | 10/1994 | Diehl et al. | 428/517 |
| 5,385,781 A | 1/1995 | Chundury et al. | 428/330 |
| 5,683,815 A | 11/1997 | Leiss | 428/424.4 |
| 5,814,702 A | 9/1998 | Avakian et al. | 525/71 |
| 6,184,298 B1 | 2/2001 | Lee | 428/31 |
| 6,306,503 B1 | 10/2001 | Tsai | 525/209 |
| 6,455,171 B2 | 9/2002 | Scheibelhoffer et al. | 428/517 |
| 6,652,985 B1 | 11/2003 | Tadokoro et al. | |
| 6,805,927 B2 | 10/2004 | Dey et al. | 428/31 |
| 7,173,093 B2 | 2/2007 | Kabs et al. | 525/209 |

FOREIGN PATENT DOCUMENTS

| | | |
|---|---|---|
| EP | 0 651 013 | 7/1998 |
| EP | 0 994 776 | 8/2003 |
| EP | 1 362 870 | 11/2003 |
| JP | 5269946 | 10/1993 |
| JP | 9193189 | 7/1997 |
| WO | WO 03/046102 | 6/2003 |

* cited by examiner

*Primary Examiner*—Sheeba Ahmed
(74) *Attorney, Agent, or Firm*—Shao-Hua Guo

(57) ABSTRACT

Multilayered structures formed from two or more polymeric layers are fabricated to obtain a single structure preferably having advantages of each of the separate layers. Polyolefin-based substrates can provide a layer with a good balance of stiffness and impact resistance, excellent processability, and relatively lower cost. Tie layers, preferably physically positioned adjacent a polyolefin-based substrate layer, facilitates adhering additional layer(s) together with the polyolefin-based substrate. Suitable tie layers generally include a multicomponent blend of at least one vinyl cyanide-containing component and at least one styrenic block copolymer component. Preferably, the additional layers include at least one acrylate-based cap layer, which can have a glossy, scratch resistance outer layer with excellent optical characteristics.

23 Claims, No Drawings

MULTILAYERED POLYMERIC STRUCTURE AND METHODS

TECHNICAL FIELD

The present invention relates generally to multilayered structures including at least one adhesive blend composition layer. More particularly, the present invention relates to multilayered polymeric structures having at least one tie layer that includes at least one vinyl cyanide-containing component to facilitate joining of a polyolefin-based substrate layer and an additional layer.

BACKGROUND OF THE INVENTION

Multilayered structures formed from two or more polymeric layers are well known in the art and are typically fabricated for the purpose of obtaining a single structure having some of the advantages of each of the separate layers. Processes that are typically used to form multilayered polymeric structures include lamination, extrusion, coextrusion, blow molding, and injection molding. Before such multilayered structures will perform successfully on an ongoing basis, however, it is important that the various layers be suitably adhered one to the other so as to avoid separation (i.e., delamination) during use. If the layers of the structure do not adhere sufficiently to each other, one or more tie layers formed from adhesive compositions have been used to join certain types of layers of a multilayer structure together. These multilayered structures find use in a variety of applications in the building and construction markets; in packaging; in leisure and recreation applications; and in the automotive industry.

Methods for increasing the adhesion between certain types of layers have been reported, for example, U.S. Pat. No. 4,588,648 discloses an adhesive layer containing an olefin copolymer grafted with maleic anhydride. U.S. Pat. No. 5,306,548 teaches the need for an intermediate adhesive layer which ties or bonds a weatherable outer layer and a polyolefin substrate such as polyethylene. The weatherable outer layer is a blend of acrylonitrile-ethylene/propylene rubber-styrene graft copolymers and a thermoplastic elastomer such as chlorinated polyethylene, aliphatic urethane, saturated styrenic block copolymers, and ethylene propylene diene copolymers. The coextruded adhesive layer contains chlorinated polyethylene, styrenic diblock and triblock copolymers, copolyamide adhesives, polyester adhesives, polyurethane adhesives, PVC, and mixtures thereof.

In addition to initial adhesion problems, however, dissimilar materials may also exhibit processability issues due to differences in rheological properties. At typical processing temperatures, polymeric materials with similar shear viscosities may have significantly different responses to the forces of tensile deformation and extensional flow. Such viscoelastic differences may result in appearance and processing problems (i.e., melt fracture, slip-and-stick phenomenon, sharkskin, and other irregular surface imperfections), as well as variations in the thickness of the layers. For example, coextruding an adhesive tie layer containing greater than 95 percent by weight of styrenic block copolymer along with a second, non-adhesive layer may result in a sharkskin appearance in the finished part and a non-uniform thickness of the adhesive layer, which detracts significantly from the aesthetics of the multilayered structure. If the processing incompatibility is severe, the layers may separate completely during processing or even later during use due to inadequate adhesion.

Blending a styrenic block copolymer with a second component to form an adhesive tie layer has also been reported. Such attempts to improve the viscoelastic differences between the various layers, however, can disadvantageously result in a reduction in the adhesive properties of the tie layer. WO 2003/046102, for example, discloses a tie layer composition containing maleic anhydride grafted styrene-ethylene-butylene-styrene block copolymer and at least one adhesion promoter, such as a tackifier resin. The material forming the tie layer may be dissolved in a suitable organic solvent and applied as a solution onto the surface of a substrate layer. EP Patent No. 994776 B1 discloses a multilayer film with an intermediate tie layer composed of a blend of a styrene-ethylene-butylene-styrene block copolymer and either a functionalized polyolefin or an ethylene acrylate copolymer.

Multilayered polymeric structures containing acrylate-based cap layers and polyolefin-based substrate layers have also been used. The cap layer provides a glossy, scratch resistance outer layer with good optical characteristics while the polyolefin-based substrate provides a layer with a balance of stiffness and impact resistance, excellent processability, and low cost. EP Patent No. 651013 B1, for example, discloses a process for improving the adherence between (meth)acrylic films and polyolefin substrates through the use of a tie layer containing 5-95 parts by weight of a butyl acrylate/methyl methacrylate core-shell polymer and 5-95 parts by weight of a grafted polypropylene/poly(methyl methacrylate/butyl acrylate) copolymer.

In addition, U.S. Pat. No. 6,455,171 relates to a multilayer structure containing a cap layer, a substrate layer, and a tie layer including either an olefin acrylate or a vinyl aromatic diene block copolymer. The cap layer includes at least 50 percent by weight of a polymethacrylate ester or polyacrylate ester. The substrate layer preferably includes 30 to 70 percent by weight propylene polymer containing less than 10 percent by weight ethylene, 7 to 65 percent by weight of a polymer of a aromatic vinyl monomer (i.e., polystyrene), and 5 to 20 percent by weight vinyl aromatic diene block copolymer. The tie layer preferably includes a multiblock polymer of styrene and either isoprene or butadiene in a particular ratio (e.g., 43% styrene:57% butadiene). In one embodiment, the tie layer contains an olefin acrylate such as ethylene methyl acrylate, ethylene ethyl acrylate, or ethylene butyl acrylate.

Polymeric materials containing unsaturated elastomers are generally, however, not thermally stable. Thus, it tends to be difficult to use them at temperatures at or above the temperature at which degradation of the unsaturated elastomer occurs, thereby limiting the usefulness of such materials in processes such as coextrusion. It is further known that unsaturated elastomers, such as conjugated diene rubbers, which have unsaturated bonds in the main chain as opposed to the side chains, are more susceptible to damage from ultraviolet radiation, oxygen, and ozone (i.e., poor weatherability). In addition, when unsaturated conjugated dienes such as butadiene are used in pigmented polymeric composites, color retention after significant outdoor exposure may be unacceptable (i.e., fading).

In light of these deficiencies, therefore, there is a need for tie layer compositions that can be used to adhere polyolefin-based substrates in particular to form multilayered polymeric structures, preferably with a tie layer disposed adjacent to the substrate layer(s) that permits the multilayer product to be prepared, finished and used without severe temperature and weathering limitations typically required of conventional tie materials. Although the multilayered polymeric structures described in the prior art above each has one or more specific properties that may exceed the norm, including mechanical strength, toughness, and scratch resistance, there remains a need for multilayered polymeric structures having greater adhesion between the layers, better weatherability, and increased color retention, while having good or increased processability and aesthetics.

SUMMARY OF THE INVENTION

The invention encompasses a multilayered polymeric structure including at least one polyolefin-based substrate layer including one or more polyolefins in a collective amount of at least about 50 weight percent, and at least one tie layer including at least one vinyl cyanide-containing component and at least one styrenic block copolymer component, wherein the tie layer is present in an amount sufficient to adhesively join at least one additional layer to the at least one substrate layer. In one preferred embodiment, the at least one additional layer includes at least one acrylate-based cap layer including from about 50 to 100 weight percent of at least one poly(alkyl(meth)acrylate).

In one embodiment, the at least one vinyl cyanide-containing component is present in an amount from about 1 to 95 weight percent and the at least one styrenic block copolymer component is present in an amount from about 1 to 95 weight percent. In another embodiment, the at least one vinyl cyanide-containing component includes at least one polar vinyl monomer present in an amount from about 5 to 85 weight percent, at least one aromatic vinyl comonomer present in an amount from about 10 to 70 weight percent, and at least one rubber moiety present in an amount from about 15 to 90 weight percent. In a preferred embodiment, the at least one polar vinyl monomer includes acrylonitrile, methacrylonitrile, or a combination thereof. In a more preferred embodiment, the at least one aromatic vinyl monomer includes styrene, p-methylstyrene, o-methylstyrene, ethylstyrene, 2,4-dimethylstyrene, vinylnaphthalene, or a combination thereof.

In another preferred embodiment, the at least one rubber moiety includes one or more ethylene/alpha-olefin copolymers, ethylene/alpha-olefin/nonconjugated diene copolymers, acrylate rubbers, acrylic acid esters, methacrylic acid esters, or a combination thereof. In yet another embodiment, the at least one vinyl cyanide-containing component includes one or more ethylene/propylene copolymer-reinforced styrene/acrylonitrile copolymers, ethylene/propylene/nonconjugated diene rubber-reinforced styrene/acrylonitrile copolymers, acrylate rubber-reinforced styrene/acrylonitrile copolymers, methacrylate rubber-reinforced styrene/acrylonitrile copolymers, or a combination thereof. In yet a further embodiment, the at least one styrenic block copolymer component includes a styrenic component and a hydrogenated olefinic component. In a preferred embodiment, the at least one styrenic block copolymer component is selectively hydrogenated, wherein at least about 80% of the double bonds in the hydrogenated olefinic component are hydrogenated, and wherein less than about 65% of the double bonds of the styrenic component are hydrogenated. In yet another preferred embodiment, the at least one styrenic block copolymer component includes styrene-ethylene-butylene, styrene-ethylene-butylene-styrene, styrene-ethylene-propylene-styrene, styrene-butylene-styrene, styrene-ethylene-propylene-styrene-styrene-ethylene-propylene-styrene, or styrene-ethylene-ethylene-propylene-styrene, or a combination thereof.

In another embodiment, the at least one acrylate-based cap layer includes at least one impact modified poly(alkyl(meth) acrylate) copolymerized with at least one acrylic, acrylate, methacrylic, or methacrylate comonomer, or a combination thereof. In yet another embodiment, the at least one polyolefin-based substrate layer includes at least one $C_2$ to $C_{20}$ alpha-olefin homopolymer, $C_2$ to $C_{20}$ alpha-olefin copolymer, thermoplastic polyolefin composition, or a combination thereof. In a further embodiment, the at least one acrylate-based cap layer, the at least one polyolefin-based substrate layer, and the at least one tie layer each further independently includes one or more thermal stabilizers, ultraviolet stabilizers, antioxidants, flame retardants, mineral fillers, process oils, processing aids, conductive fillers, nucleating agents, plasticizers, impact modifiers, colorants, mold release agents, lubricants, antistatic agents, pigments, or a combination thereof.

The invention also encompasses a thermoformed article including the multilayered polymeric structure described above. The invention further encompasses a polymeric article including the multilayered polymeric structure above, wherein the at least one acrylate-based cap layer, the at least one polyolefin-based substrate layer, and the at least one tie layer are permanently joined. In a preferred embodiment, the polymeric article has a thickness of at least about 0.1 mm to about 38 mm.

The invention also encompasses extruded articles including the above-described multilayered polymeric structure. In one embodiment, the polyolefin-based substrate layer and the tie layer are coextruded into a planar form. In yet another embodiment, the coextruded planar form is laminated sequentially or in line with at least one acrylate-based cap layer. In a preferred embodiment, the acrylate-based cap layer, the tie layer, and the polyolefin-based substrate layer are prepared in separate extruders and subsequently coextruded.

The invention further encompasses a method of forming a multilayered polymeric structure by providing at least one polyolefin-based substrate layer including at least one polyolefin in an amount of at least about 50 weight percent and at least one additional layer, and interposing a sufficient amount of at least one tie layer including at least one vinyl cyanide-containing component and at least one styrenic block copolymer component between the at least one substrate layer and the at least one additional layer so as to join the layers together. Preferably, the additional layer is at least one acrylate-based cap layer including from about 50 to 100 weight percent of at least one poly(alkyl(meth)acrylate). In one embodiment, the multilayered polymeric structure is thermoformed to provide a polymeric product having characteristics of the at least one cap material and the at least one substrate material.

The invention additionally encompasses an adhesive composition including the tie layer material present in an amount sufficient to permanently adhere two polymeric layers to each other when the tie layer composition is disposed therebetween. It should be understood that each of the embodiments herein may be used with or in place of other embodiments. All of the patents and other publications recited in the summary and detailed description are incorporated herein by express reference thereto.

DETAILED DESCRIPTION OF THE PREFERRED EMBODIMENTS

The multilayered polymeric structure of the present invention typically includes at least one polyolefin-based substrate layer and at least one tie layer preferably disposed adjacent to a substrate layer to join the substrate layer to an additional layer(s). The additional layer(s) preferably form the surface, or outer layer, of the multilayer polymeric structure. The tie layer, which is preferably at least essentially, or entirely, free of any solvents or tackifier resins, is utilized to facilitate adherence of the substrate layer to the additional layer(s). Preferably, the additional layer(s) include at least one cap layer. The additional layer, or "cap layer," is preferably a polymer composition containing at least one poly(alkyl (meth)acrylate), a fluoropolymer, or a blend thereof. Generally, the tie layer of the invention includes a multicomponent blend containing at least one vinyl cyanide-containing component and at least one styrenic block copolymer component.

As used herein, the term "layer" refers to each of the one or more materials, the same or different, in an essentially planar or planar form, that are secured to one another by any appropriate means, such as by an inherent tendency of the materials to adhere to one another, or by inducing the materials to adhere as by a heating, radiative, chemical, or other appropriate process or composition to form multilayered polymer structures. It should be understood that the structures of the invention include at least two, and preferably three, layers, and that the structures as a whole may then have any shape desired and selected, for example, planar, curved, angled surfaces, or any combination of these or other shapes. The further shape can be imparted by additional processing, e.g., molding, thermoforming, or the like.

As is well known in the art, the demarcation between the terms "film" and "sheet" is nominally at a thickness of about 0.25 mm. However, as used herein, the term "sheet" is not intended to be limited to a particular thickness unless otherwise stated. As such, the "sheet(s)" of the invention can refer to single layered or multilayered structures formed from a continuous plastic matrix with thicknesses that are greater than, equal to, or less than 0.25 mm.

The multilayered polymeric structure of the present invention may be produced by any methods available in the art, such as by coextrusion techniques, lamination techniques, thermoforming, or any combination thereof.

Coextrusion is generally a process in which two or more molten polymeric compositions are simultaneously extruded through multiple extrusion heads or, alternatively, through a multi-manifold die, to form a laminar structure with different functional properties in each layer. The resulting multilayered extrudate is then placed on a chill roll to be cooled. The cooled multilayered extrudate is then typically cut to size or rolled by appropriate means. One particular advantage of coextrusion is the formation of a multilayered structure in a single process step by combining molten layers of at least one tie layer composition and at least one polyolefin-based substrate layer composition into a unitary layered structure.

Lamination is generally defined as the process of bonding together two or more prefabricated sheet or film layers by the use of adhesives, or by a combination of heat and pressure (i.e., melt-pressing). Alternatively, hot melt lamination or thermal lamination brings two or more molten layers of polymer together outside the extrusion die, usually at a nip roll or at the top roll of a roll stack.

The at least one polyolefin-based substrate layer contains one or more polyolefins that are homopolymers of a $C_2$ to $C_{20}$ alpha-olefin, copolymers of one or more $C_2$ to $C_{20}$ alpha-olefins, terpolymers of two or more $C_2$ to $C_{20}$ alpha-olefins, or mixtures thereof. Preferred $C_2$ to $C_{20}$ alpha-olefins include ethylene, propylene, 1-butene, 1-pentene, 1-hexene, methyl-1-butenes, methyl-1-pentenes, 1-octene, 1-decene, or combinations thereof. Copolymers or terpolymers, if used, may preferably include a random copolymer or an impact block copolymer (e.g., a block copolymer composed of propylene polymer units and ethylene/propylene copolymer units).

One embodiment of a suitable polyolefin-based substrate layer component is polypropylene, defined as any propylene-based polymer having a propylene-derived content of at least about 60 percent by weight of the polypropylene. In a preferred embodiment, the polypropylene homopolymer or copolymer is semi-crystalline. "Semi-crystalline," as used herein, preferably means that the crystallinity is at least about 40%, and preferably at least about 55%.

Another embodiment of a suitable polyolefin-based substrate layer component is polyethylene, defined as any ethylene-based polymer having an ethylene-derived content of at least about 50 percent by weight of polyethylene. In one embodiment, the polyethylene is a homopolymer or copolymer with a density of greater than 0.910 g/cm$^3$ (i.e., high density polyethylene). In a preferred embodiment, an ethylene copolymer containing at least one additional alpha-olefin herein described is substantially amorphous and has a density from about 0.85 to 0.910 g/cm$^3$ (i.e., the so-called elastomers and plastomers). Preferably, at least one substrate layer is essentially, or entirely, free of foaming agents or the voids that may result, so as to form a substantially or entirely solid substrate layer, i.e., non-foamed substrate layer(s). In another embodiment, the ethylene copolymer includes at least one alpha-olefin and at least one nonconjugated diene monomer. "Substantially amorphous," as used herein, typically means the ethylene/alpha-olefin copolymer has less than about 20 percent crystallinity.

The manufacture or polymerization of the one or more polyolefins useful in the present invention may be realized either continuously or in a batchwise or a semicontinuous process, though a continuous process may be preferred, e.g., for economic reasons. The polymerization may be performed by any suitable method, such as by known methods that include, for example, a gas phase polymerization or a liquid phase polymerization, such as solution, slurry, or bulk, polymerization.

Generally, without limitation of the scope of the invention, polymerization of the polyolefin homopolymer occurs when alpha-olefin monomer(s), solvent, and a catalyst system are introduced into a reactor, such as a stirred tank reactor. Copolymerization, if used, typically occurs in any subsequent stages and may preferably be carried out after the first stage polymerization in a continuous manner for the formation of polyolefin copolymers, as described in U.S. Pat. No. 3,318,976, which is hereby incorporated by express reference thereto. In typical processes of this kind, polyolefin homopolymer is formed in one stage and the copolymer is formed in a separate stage, in the presence of the homopolymer and of the original catalyst. Multiple stage processes of this type are also known, and any suitable type can be used in accordance with the present invention. When a batch process is employed, the multistage polymerization can be effected in a single reactor. Illustrative catalyst systems that can be used include the so-called Ziegler-Natta, Kaminsky, metallocene, organometallic, constrained geometry, metal centered/heteroaryl ligand and other single-site catalysts and are described in greater detail in U.S. Pat. No. 5,324,800, which is incorporated by express reference thereto.

Suitable polyolefin blends containing two or more polyolefins may be made by any available method, including for example physical melt blending, in-situ reactor-made, or a combination thereof. In physical melt blending, the individual polyolefin components are typically combined in a mechanical extruder or mixer, and then heated to a temperature sufficient to form a polymer melt. The mechanical mixer can be a continuous or batch mixer. Examples of suitable continuous mixers include single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of suitable batch mixers are lateral 2-roll mixers such as Banbury™ or Boling™ mixers. In-situ reactor-made blends are typically achieved when semi-crystalline polyolefins and substantially amorphous polyolefins are produced in situ during a single or multiple stage polymerization process.

In a preferred embodiment, the polyolefin-based substrate layer component contains at least one thermoplastic polyolefin (TPO) composition, defined herein as a two-phase melt blend containing a continuous phase of at least one semi-crystalline polypropylene component and a dispersed phase containing at least one substantially amorphous elastomer component. The elastomer component typically includes at least one ethylene/alpha-olefin copolymer, at least one styrenic block copolymer, or a mixture thereof. Preferred thermoplastic polyolefin materials provide a beneficial balance of stiffness (e.g., flexural modulus typically ranging from 270-2900 MPa), as well as impact resistance (e.g., ductile at room temperature, preferably ductile at −30° C.), yet are melt processable with most conventional thermoplastic processing equipment. The polyolefin-based substrate layer component has a typical melt flow rate (as determined by ASTM D-1238-01 at a temperature of 230° C. and at a load of 2.16 kg) of about 0.001 dg/min to 300 dg/min, preferably about 0.01 to 150 dg/min, and more preferably about 0.1 to 50 dg/min. Preferably, the polyolefin-based substrate layer component is further characterized by a density typically from about 0.813 g/cm$^3$ to about 1.305 g/cm$^3$. A preferred density of the polyolefin-based substrate layer component is from about 0.858 g/cm$^3$ to 1.250 g/cm$^3$.

In one embodiment, the polyolefin blends may be subsequently pelletized via strand pelleting or commercial underwater pelletization. In another embodiment, the molten polyolefin material is then extruded to form the polyolefin-based substrate layer. In another embodiment, the molten polyolefin material is coextruded with the tie layer component to form a multilayered polymeric structure.

In one embodiment, the polyolefin-based substrate layer is prepared from a polymer composition that is essentially free of polystyrene homopolymer having a styrene-derived content of greater than 75 percent by weight of the polystyrene. In another embodiment, the substrate layer is prepared from polymer compositions which are essentially free, or entirely free, of grafted polystyrene. In a more preferred embodiment, the polyolefin-based substrate layer is essentially or entirely free of both such a styrene-derived content and grafted polystyrene. In another embodiment, the substrate layer is essentially, or entirely, free of conjugated diene rubber.

Suitable examples of polyolefin-based substrate compositions that can be included in accordance with the invention include, for example, those commercially available as Sequel® E-3000 from Solvay Engineered Polymers, Mansfield, Tex., and as various types of polyolefin copolymers and blends available from ExxonMobil Chemicals Company of Houston, Tex., from Sunoco Chemicals of Pittsburgh, Pa., and from Dow Chemical Company of Midland, Mich.

The at least one tie layer is preferably formed of a blend of polymeric materials, typically including at least one vinyl cyanide-containing component and at least one styrenic block copolymer component. The tie layer is typically physically positioned between, and adheres sufficiently to, each of the acrylate-based cap layer and the polyolefin-based substrate layer to form a composite multilayer polymeric structure. The at least one tie layer preferably provides sufficient adhesion to prevent delamination, or separation, of the layers of the multilayered polymeric structure of the present invention, especially during thermoforming conditions. More preferably, the at least one tie layer is sufficiently adhesive to minimize processing problems with insufficiently adhered cap and substrate layers, as well as to retain the structure during ultimate use as or in a final product even after the processing.

It has been surprisingly and unexpectedly found that, through the combination of the at least one vinyl cyanide-containing component and the at least one styrenic block copolymer component, it is possible to significantly modify the rheological properties of the tie layer and improve the processability, as evidenced by the reduction in surface defects, between the tie layer and other non-adhesive layers (i.e., the acrylate-based cap layer or the polyolefin-based substrate layer), without detracting from the adhesive properties of the tie layer composition. Preferably, this is achieved by melt blending, although other suitable methods may be used according to the invention.

In addition, the multicomponent tie layer of the present invention surprisingly and unexpectedly improves the thermoformability of the multilayered polymeric structure due to better high temperature creep resistance. Creep is defined as the deformation of a material while under constant load. High temperature creep resistance is critical during the thermoforming process to minimize undesired thinning of the tie layer and the undesirable loss of adhesion between the various layers of a polymeric structure that may result.

In one embodiment, the tie layer can be prepared from polymer compositions that are essentially free of one or all tackifier resins. In another embodiment, the tie layer polymer compositions can be essentially free of one or all solvents. In another embodiment, the tie layer polymer compositions can be essentially free of polystyrene homopolymer having a styrene-derived content of greater than 75 percent by weight of the polystyrene. In yet another embodiment, the tie layer can be essentially free of one or all chlorinated polyolefin polymers. In each of these embodiments, the tie layer may be entirely free of each of these materials, or any combination thereof.

The at least one vinyl cyanide-containing component is typically present in an amount of less than about 95 weight percent of the total weight of the polymers present in the tie layer, preferably from about 1 to 90 weight percent, and more preferably from about 2 to 80 weight percent. While any suitable vinyl cyanide-containing component available in the art may be included, the vinyl cyanide-containing component preferably is in the form of one or more rubber-reinforced copolymer resins, e.g., obtained by polymerizing at least one polar vinyl monomer in the presence of at least one aromatic vinyl monomer, and by modifying the copolymer resin with one or more rubber moieties. The amount of the at least one polar vinyl monomer present in the vinyl cyanide-containing component is from about 5 weight percent to 85 weight percent, preferably from about 10 weight percent to 70 weight percent, based on the total weight of the vinyl cyanide-containing component. Illustrative, but non-limiting, examples of polar vinyl monomers include acrylonitrile and its derivatives, such as methacrylonitrile, or combinations thereof. The amount of the at least one aromatic vinyl monomer present in the vinyl cyanide-containing component is typically from about 10 weight percent to 70 weight percent, preferably from about 10 weight percent to 65 weight percent, based on the total weight of the vinyl cyanide-containing component. Preferably, the at least one aromatic vinyl monomer may be present in an amount of about 15 weight percent to 50 weight percent of the vinyl cyanide-containing component. Illustrative, non-limiting, examples of aromatic vinyl monomers include styrene, p-methylstyrene, o-methylstyrene, ethylstyrene, 2,4-dimethylstyrene, vinylnaphthalene, and the like, or any combination thereof.

The amount of the rubber moiety that can be included in the vinyl cyanide-containing component may be selected appropriately so as to satisfy the intended purpose of the present invention based on the guidance provided herein. The rubber moiety can typically be present in an amount from about 15 weight percent to 90 weight percent, preferably from about 20 weight percent to 75 weight percent, and more preferably from about 25 weight percent to 60 weight percent, based on the total weight of the vinyl cyanide-containing component. Illustrative, non-limiting, examples of a suitable rubber moiety include, for example, ethylene/alpha-olefin copolymers such as ethylene/propylene copolymer, ethylene/butene copolymer, ethylene/hexene copolymer, ethylene/octene copolymer, and the like; ethylene/alpha-olefin/nonconjugated diene copolymers such as ethylene/propylene/nonconjugated diene copolymer, ethylene/butene/nonconjugated diene copolymer, ethylene/hexene/nonconjugated diene copolymer, and the like; acrylate rubber; acrylic acid esters, such as methyl acrylate, ethyl acrylate, propyl acrylate, butyl acrylate, hexyl acrylate, 2-ethylhexyl acrylate, cyclohexyl acrylate, and the like; methacrylic acid esters, such as methyl methacrylate, ethyl methacrylate, propyl methacrylate, butyl methacrylate, hexyl methacrylate, 2-ethylhexyl methacrylate, cyclohexyl methacrylate, dodecyl methacrylate, octadecyl methacylate, and the like; or any combination thereof. The rubber moiety may be added during the copolymerization of one or more polar vinyl monomers and one or more aromatic vinyl monomers, or may be added subsequently to the polymerization step. The nonconjugated diene monomers are preferably not present in the main chain of the rubber moiety. In one embodiment, the vinyl cyanide-containing component is essentially free, or entirely free, of butadiene.

The vinyl cyanide-containing component may be polymerized by any method available in the art, preferably by an emulsion polymerization process, a bulk polymerization process, a suspension polymerization process, a solution polymerization process, a block-suspension polymerization process, a bulk-solution polymerization process, a continued block polymerization process, or the like, or any combination thereof. The preferred vinyl cyanide-containing component includes one or more ethylene/propylene copolymer-reinforced styrene/acrylonitrile copolymers, ethylene/propylene/nonconjugated diene rubber-reinforced styrene/acrylonitrile copolymers, acrylate rubber-reinforced styrene/acrylonitrile copolymers, methacrylate rubber-reinforced styrene/acrylonitrile copolymers, or any combination thereof.

The at least one vinyl cyanide-containing component typically has a melt flow rate (as determined by ASTM D-1238-01) at a temperature of 230° C. and at a load of 10 kg) ranging from about 0.001 dg/min to about 150 dg/min, preferably from about 0.01 dg/min to about 124 dg/min, and more preferably from about 0.05 dg/min to about 90 dg/min. The vinyl cyanide-containing component is preferably further characterized by a density typically ranging from about 0.93 g/cm$^3$ to about 1.15 g/cm$^3$, preferably from about 0.96 g/cm$^3$ to about 1.13 g/cm$^3$, and more preferably from about 0.98 g/cm$^3$ to about 1.12 g/cm$^3$.

Exemplary types of vinyl cyanide-containing materials for inclusion in the vinyl cyanide-containing component according to the invention include those that are commercially available as, for example, DIALAC from UMG ABS, Ltd. of Tokyo, Japan, as UNIBRITE from Nippon A&L Inc. of Osaka, Japan, as CENTREX from Lanxess Corporation of Pittsburgh, Pa., and as various types of vinyl cyanide-containing materials from Techno Polymers Co., Ltd. of Tokyo, Japan and from Southland Polymers of Santa Fe Springs, Calif.

The at least one styrenic block copolymer component, referring to a polymer having at least one styrenic block component in combination with a partially or selectively saturated (i.e., hydrogenated) olefinic block component, is present in an amount of less than about 95 weight percent of the total weight of the polymers present in the tie layer, preferably ranging from about 1 to 90 weight percent, and more preferably from about 10 to 85 weight percent. In one embodiment, the styrenic block copolymer component includes more than one styrene block component.

The structure of the styrenic block copolymer component useful in the current invention can be of the linear or radial type, and preferably of the diblock or triblock type. The styrenic portion of the styrenic block copolymer is preferably a polymer of styrene and its analogs and homologs, including alpha-methylstyrene, and ring-substituted styrenes, particularly ring-methylated styrenes, or any combination thereof. The preferred styrenics are styrene and alpha-methylstyrene, or a combination thereof, with styrene being especially preferred. The styrene content of the styrenic block copolymer is typically from about 1 to 70 weight percent, preferably from about 2 to 65 weight percent, and more preferably from about 3 to 45 weight percent. In one embodiment, the styrene content of the styrenic block copolymer may be from about 1 to 23 weight percent. The hydrogenated or saturated olefinic block component of the styrenic block copolymer is preferably a hydrogenated conjugated diene component, including, but not limited to, ethylene, butylene, propylene, or a combination thereof.

In one embodiment, the amorphous styrenic block copolymer component contains at least one hydrogenated conjugated diene block component, and is preferably styrene-butylene-butadiene-styrene, styrene-ethylene-butylene-styrene, styrene-ethylene-propylene-styrene, styrene-ethylene-propylene-styrene-styrene-ethylene-propylene-styrene, or styrene-ethylene-ethylene-propylene-styrene, or a combination thereof. The styrenic block copolymer component may be grafted with one or more unsaturated carboxylic acids, anhydrides, or epoxy-containing compounds. In one embodiment, the styrene block copolymer component is ungrafted.

The hydrogenation of the styrenic block copolymer component is preferably partial or selective, such that at least about 80% of the double bonds in the conjugated diene component are hydrogenated. Selective hydrogenation of the styrenic block copolymer tends to increase the weatherability of the tie layer of the invention as a whole by decreasing the number of unsaturated bonds in the main chain of the polymer backbone. With hydrogenated styrenic block copolymers, typically no more than about 65% of the double bonds of the styrenic portion are hydrogenated, preferably no more than about 50%, and more preferably no more than about 35% of the double bonds of the styrenic portion are hydrogenated. In an exemplary embodiment, no more than about 20% of the double bonds of the styrenic portion are hydrogenated. A possible method for the selective hydrogenation of styrenic block copolymers is disclosed in, for example, U.S. Pat. No. 3,595,942, which is incorporated herein by express reference thereto.

The at least one styrenic block copolymer component typically has a melt flow rate (as determined by ASTM D-1238-01) at a temperature of 230° C. and at a load of 2.16 kg) ranging from about 0.001 dg/min to about 200 dg/min, preferably from about 0.001 dg/min to about 124 dg/min, and more preferably from about 0.01 dg/min to about 90 dg/min. The styrenic block copolymer component may be further characterized by a density typically ranging from about 0.83 g/cm$^3$ to about 1.15 g/cm$^3$, preferably from about 0.85 g/cm$^3$ to about 1.01 g/cm$^3$, and more preferably from about 0.86 g/cm$^3$ to about 0.98 g/cm$^3$.

Exemplary styrenic block copolymers suitable for inclusion in the tie layer include those commercially available as SEPTON from Kuraray Company, Ltd. of Tokyo, Japan, as KRATON G series from Kraton Polymers of Houston, Tex., as TUFTEC from Asahi America Inc. of Malden, Mass., or as DYNARON from Japan Synthetic Resin of Tokyo, Japan.

The at least one vinyl cyanide-containing component and the at least one styrenic block copolymer component included in the multicomponent tie layer are typically combined in a mechanical extruder or mixer, and then heated to a temperature sufficient to form a polymer melt while being exposed to sufficient shear to intimately mix the individual components. Other suitable methods, however, may be used. In one embodiment, the multicomponent blends may be subsequently pelletized via strand pelleting or commercial underwater pelletization. In another embodiment, the molten multicomponent material is then extruded to form the tie layer. In another embodiment, the molten multicomponent material is coextruded with the polyolefin-based substrate layer component to form a multilayered polymeric structure.

The at least one acrylate-based cap layer contains from about 50% to about 100%, and preferably, from about 70% to about 100%, by weight of at least one poly(alkyl(meth)acrylate) material. As used in this term, "alkyl" preferably refers to a $C_1$-$C_{10}$ alkyl, which may be branched but are preferably straight chains. Preferably, the poly(alkyl(meth)acrylate) includes one or more of poly(methyl acrylate), poly(methyl methacrylate), poly(ethyl acrylate), poly(ethyl methacrylate), poly(butyl acrylate), poly(butyl methacrylate), or a combination thereof. As used herein, the term poly(alkyl (meth)acrylate) refers to either the corresponding acrylate or methacrylate polymer. An exemplary poly(alkyl(meth)acrylate) might include polymethacrylic ester or polyacrylic ester polymer or copolymer. Preferably, the acrylate-based cap layer contains one or more methacrylate (co)polymers formed from methyl methacrylate monomer as described in U.S. Pat. No. 7,173,093, which is hereby incorporated by express reference thereto.

In addition, various acrylic, acrylate, methacrylic, or methacrylate comonomers may be copolymerized with the at least one poly(alkyl(meth)acrylate) to form an impact modified poly(alkyl(meth)acrylate). Several examples of acrylate monomers include, but are not limited to, butyl acrylate, ethyl acrylate, methyl acrylate, hexyl acrylate, isobutyl acrylate, nonyl acrylate, octyl acrylate, propyl acrylate, or any combination thereof. Several examples of methacrylate monomers may include, but are not limited to, butyl methacrylate, cyclohexyl methacrylate, decyl methacrylate, ethyl methacrylate, methyl methacrylate, octyl methacrylate, isobutyl methacrylate, propyl methacrylate, phenyl methacrylate, or any combination thereof.

While the inclusion of acrylate and methacrylate comonomers to form the impact modified poly(alkyl(meth)acrylate) copolymers may be included to confer desired flexibility upon the poly(alkyl(meth)acrylate), such comonomers tend to reduce the hardness of the acrylate-based cap layer and thus tend to reduce its mar or scratch resistance. Thus, to achieve a balance between flexibility and hardness (i.e., scratch resistance), it is preferable in one embodiment for the acrylate or methacrylate comonomer content, when included, to be less than about 50% by weight of the poly(alkyl(meth)acrylate). The most preferred comonomers include butyl acrylate or butyl methacrylate, which are preferably incorporated into the poly(alkyl(meth)acrylate) in an amount of up to about 40% by weight of the poly(alkyl(meth)acrylate).

The impact modified poly(alkyl(meth)acrylate) composition may optionally, but preferably, contain one or more crosslinking monomers each of which preferably can contain at least two or more unsaturated vinyl groups. Suitable crosslinking monomers ("crosslinkers") include, but are not limited to, ethylene glycol dimethacrylate, polyethylene glycol diacrylate and dimethacrylate, propylene glycol dimethacrylate and diacrylate, glycidyl methacrylate, divinylbenzene, triallyl isocyanurate, N-(hydroxymethyl)acrylamide, allyl acrylate, allyl methacrylate, N,N'-methylene diacrylamide and dimethacrylamide, triallyl citrate, trimethylolpropane triacrylate, trimethylolpropane trimethacrylate, diethyleneglycol divinyl ether, or any combination thereof. Preferred crosslinkers are allyl methacrylate, ethylene glycol dimethacrylate and divinylbenzene. The amount of crosslinking monomer is generally from about 0.1 to 20%, typically from about 0.5 to 10%, preferably from about 0.5 to 5%, more preferably from about 1 to 4%, and in one most preferred embodiment from more than about 1.5% to 3%, each based on the total weight of the crosslinked poly(alkyl(meth)acrylate) polymer.

The acrylate-based cap layer composition can be prepared in any shape or arrangement, but is typically formed into pellets, sheet, or film products by any suitable method, including, but not limited to, melt extrusion, bulk polymerization, emulsion polymerization, suspension polymerization, cell casting polymerization, and continuous cast polymerization. Cell cast sheet or film products, for example, may be formed by filling a mold with (meth)acrylate monomer (or other suitable material, such as (meth)acrylate monomer/poly (alkyl(meth)acrylate) polymer syrup), and any additive(s) and cross-linking monomer(s), if used. The composition is then heated, generally through the use of a carefully controlled temperature ramp to ensure complete cure and to minimize any possibility of losing control of the polymerization exotherm. The finished sheet is cooled and then typically annealed at about 140° C. to 150° C., or other suitable temperature depending on the materials, over the course of several hours to reduce stress within the sheet or film.

In one embodiment, a useful sheet or film may be formed from a cross-linked poly(alkyl(meth)acrylate). In another embodiment, a useful sheet or film may be formed from a cross-linked poly(alkyl(meth)acrylate) dispersed in a continuous phase of a predominantly methacrylate polymer generally containing minor amounts of one or more acrylates, acrylic acids, or methacrylic acids copolymerized therewith.

In one embodiment, the acrylate-based cap layer is prepared from polymer compositions which are essentially free, or entirely free, of ionomers. In another embodiment, the cap layer is prepared from polymer compositions which are essentially free, or entirely free, of polyamides, e.g., nylon polymers. In another embodiment, the cap layer is essentially free, or entirely free, of fluoropolymers. Suitable examples of acrylate-based cap layer polymer compositions that can be used according to the invention include those commercially available as PLEXIGLAS from Altuglas International, Philadelphia, Pa., as LUCITE from Lucite International, Southampton, U.K., as KORAD from Spartech PEP, Newark, N.J., as ACRYLITE from Cyro Industries, Parsippany, N.J., and as SUMIPEX from Sumitomo Corporation, Tokyo, Japan.

One or more of a variety of conventional additives may also be optionally, but preferably, included in one or more of the layers of the present invention. One or more additives may be included in any of the layers of the polymeric structure of the invention, as suggested by the intended use of the known additive material, and the guidance provided herein coupled with the knowledge and experience of those of ordinary skill in the art. In one embodiment, the at least one acrylate-based cap layer includes one or more additives. In another embodiment, the at least one tie layer includes one or more additives. In another embodiment, the at least one polyolefin-containing substrate layer includes one or more additives. Such additives may include one or more colorants, pigments, mineral fillers, thermal stabilizers, ultraviolet stabilizers, processing aids, antioxidants, waxes, flame retardants, dispersants, antistatic agents, lubricants, extender or process oils, plasticizers, nucleating agents, slip agents, mold release agents, and the like, or combinations thereof. These are preferably independently selected depending on the other materials present in a given layer and the desired or selected characteristics of that layer in the final multilayer polymeric structure. Two particularly preferred additives are further discussed below.

Suitable pigments include, but are not limited to, inorganic pigments and colorants (e.g., metal oxides and chromates, and the like), organic pigments, and the so-called special effects pigments (e.g., metallic flake and pearlescent pigments, and the like), or a combination thereof. The pigment, when included, is preferably first dispersed in a suitable polymer carrier before being introduced into the present inventive blend. When such optional pigments are included, they may typically be present in an amount of about 0.01 weight percent to 13 weight percent, preferably in an amount of about 0.1 weight percent to 10 weight percent and more preferably in an amount of about 0.5 weight percent to 9 weight percent, based on the total weight of the polymers present in the blend.

Suitable mineral fillers include, but are not limited to, talc, ground calcium carbonate, precipitated calcium carbonate, zinc oxide, precipitated silica, precipitated silicates, precipitated calcium silicates, pyrogenic silica, hydrated aluminum silicate, calcined aluminosilicate, clays, mica, wollastonite, and a combination thereof. When such optional mineral fillers are included, they can typically be present in an amount of about 0.01 to 45 weight percent, preferably in amounts of about 0.05 to 40 weight percent in one embodiment and in amounts of about 0.1 to 37 weight percent in another embodiment.

The number of layers in the multilayered polymeric structure of the present invention may be adjusted to meet the requirements of a particular end use application. In one embodiment, the multilayered polymeric structure includes at least one acrylate-based cap layer and at least one adhesive tie layer adjacent to the acrylate-based cap layer. In another embodiment, the multilayered polymeric structure includes at least one polyolefin-based substrate layer and at least one adhesive tie layer adjacent to the polyolefin-based substrate layer. In a preferred embodiment, the multilayered polymeric structure includes at least one acrylate-based cap layer, at least one tie layer, and at least one polyolefin-based substrate layer. It should be understood that any additional layers can be added according to the invention, for example, a second adhesive tie layer between a cap layer and a substrate layer, or even a completely different layer having other characteristics, which can be disposed between a cap and substrate layer or even on an opposite side of such a layer.

The thickness of the various layers in the multilayered polymeric structure may vary according to the application and the desired properties of the structure. Although each layer of the multilayered structure may be of different thicknesses, the thickness of the acrylate-based cap layer may generally range from about 0.04 mm to 10 mm, preferably 0.05 mm to 8 mm, and more preferably 0.07 mm to 3 mm. The thickness of the polyolefin-based substrate layer may generally range from about 0.05 mm to 25 mm, preferably 0.1 mm to 15 mm, and more preferably from 0.5 mm to 9 mm. The thickness of the tie layer may generally range from about 0.001 mm to 3 mm, preferably from 0.01 mm to 2 mm, and more preferably from 0.04 to 1 mm. Desirable ranges may include any combination of any upper tie layer thickness limit and any lower tie layer thickness limit described herein, or any tenth of a value in between.

The various layers of the present invention may be combined in the melt stage via appropriate mechanisms known in the art prior to exiting the extruder/die, or combined after exiting the extruder/die. In one embodiment, the acrylate-based cap layer component, the tie layer component, and the polyolefin-based substrate layer component are prepared in separate extruders and subsequently coextruded through multiple extrusion heads or a multi-manifold die to form a laminar multilayer polymeric structure. Alternatively, the various layers may be separately extruded, cooled on a chill roll or other appropriate manner, and then cut to size or rolled by appropriate means. In a preferred embodiment, the techniques of coextrusion and lamination may be used sequentially to form the multilayered polymeric structure of the present invention. For example, a preformed multilayered sheet of the polyolefin-based substrate layer and the tie layer may be provided by coextruding the substrate layer material and the tie layer material through a sheet die of desired width according to well known coextrusion techniques. The coextruded substrate and tie layers may then be allowed to cool and taken up in roll form for subsequent lamination with the acrylate-based cap layer which is itself most preferably provided in roll form. Alternatively, the coextruded substrate and tie layers may be laminated continuously with a cap layer and cooled in line (i.e., in line lamination).

The planar multilayered polymeric structure of the present invention may be further shaped into a three-dimensional part by any suitable method. Thermoforming, for example, is the process of heating a plastic material in film or sheet form to its particular processing temperature and forming the hot and flexible material against the contours of a mold by mechanical or pneumatic means. When held to the shape of the mold and allowed to cool, e.g., by quenching, the plastic retains the shape and detail of the mold. The process of thermoforming is well known to those skilled in the art and is described in detail in Throne, "Thermoforming" (ISBN 0-02-947610-0) Hanser Publications, New York (1987). The thermoforming process may involve one or more of: (1) heating the multilayered sheet in a separate oven and then transferring the hot sheet to a forming press; (2) using automatic machinery to combine heating and forming in a single unit; or (3) a continuous operation feeding off a roll of thermoplastic material or directly from the exit of an extruder die (post-forming).

The multilayered polymeric structures of the present invention may find use in a variety of applications in the building and construction markets (home and commercial siding, window and door profiles, gutters); in packaging (for both food and nonfood products); in leisure and recreation applications (spas, marine components, outdoor furniture, snowmobile components, recreational vehicles, motor homes, campers, etc.); appliances and tools (lawn and garden implements, bathroom fixtures, computer housings); and in the automotive industry (body side moldings, bumpers, decorative exterior trim, interior trim, and mirror housings), as well as other uses where multilayer structures according to the invention may be desired.

The term "about," as used herein, should generally be understood to refer to both numbers in a range of numerals. Moreover, all numerical ranges herein should be understood to include each whole integer within the range. When the term "percent by weight" or "weight percent" is used in reference to a polymer, it refers to the amount in weight percent of the polymer compared to the total amount of polymers in the blend or article.

"Essentially free," as used herein, refers to no more than about 5 percent, preferably no more than about 1 percent, and more preferably no more than about 0.5 percent of the characteristic referred to. In one preferred embodiment, "essentially free" refers to less than about 0.1 percent. These terms also encompass the absence of any detectable amount, as well as the complete absence, of the referenced characteristic.

EXAMPLES

The invention is further defined by reference to the following examples, describing the multilayered polymeric structure of the present invention. It will be apparent to those of ordinary skill in the art that many modifications, both to materials and methods, may be practiced without departing from the purpose and intent of this invention based on the description herein. Thus, the following examples are offered by way of illustration, and not by way of limitation, to describe in greater detail certain methods for the preparation, treatment, and testing of some multilayered polymeric structures of the invention.

Example 1

A Multilayered Polymeric Structure According to the Invention

During the adhesion trials, a multicomponent tie layer containing 60 percent by weight rubber modified vinyl cyanide-containing copolymer (melt flow rate=8 dg/min at 220° C./10 kg load; density=1.05 g/cm$^3$) and 40 percent by weight hydrogenated styrenic block copolymer (melt flow rate=4.5 dg/min at 230° C./2.16 kg load; density=0.89 g/cm$^3$) was prepared and then compression molded into thin sheets for subsequent use in testing the adhesion of the multilayered polymer structure of the present invention. The individual components of the tie layer were dry blended and then compounded on a BR Banbury mixer for approximately 150 seconds. The sample containing the resulting tie layer component was pressed into a thin sheet approximately 1 mm in thickness using a Carver hot press set at 204° C., and then subsequently quench cooled.

To test the adhesion of the tie layer, a multilayered composite structure was assembled using a 7.6 cm×7.6 cm×2 mm disk of TPO (Sequel® E-3000), the tie layer between the TPO and the acrylate-based cap layer, and a Korad® acrylate-based cap layer. The composite was placed between two pieces of Mylar sheets and placed on the Carver hot press for two minutes at 204° C. The conditioning time allowed the TPO layer and the tie layer to soften to mimic the conditions that may be present during coextrusion. After two minutes, the multilayered structure was pressed at less than 6.9 MPa for ten seconds. After the pressure was released, the multilayered structure was quench cooled.

After the multilayered structures were completely cooled, the adhesion between the acrylate-based cap layer and the adjacent tie layer was tested. For acrylate-based cap layers that could not be removed from the tie layer, these were rated as having excellent adhesion. For acrylate-based cap layers that exhibited some adherence to the tie layer, but could be removed, these were rated as good. For acrylate-based cap layers that exhibited little or no adherence to the tie layer, the adhesion was rated as poor or no adherence. The adhesion between the tie layer and the polyolefin-based substrate layer was similarly tested. Results are shown in Table 1. A tie layer prepared according to the invention in Example 1 surprisingly and unexpectedly achieved excellent adhesion with both the substrate layer and the cap layer.

Comparative Example 1

No Tie Layer

To illustrate the surprising and unexpected benefits of the tie layer of the present invention, a sample of Korad® acrylate-based cap layer and the Sequel® E-3000 substrate layer from Ex. 1 were hot pressed, and the adhesion was evaluated as described in Ex. 1. No adhesion between the two layers was observed.

Comparative Example 2

Single Phase Tie Layer Containing Maleated Polypropylene

A tie layer to be disposed between the cap and substrate layers was prepared for the adhesion trial as described in Ex. 1 except that maleated polypropylene (0.5 percent by weight maleic anhydride) was substituted for the inventive rubber modified vinyl cyanide-containing copolymer/styrenic block copolymer blend. A sample of Korad® acrylate-based cap layer, the maleated polypropylene tie layer, and the Sequel® E-3000 substrate layer were hot pressed, and the adhesion was evaluated as described in Ex. 1. Results are shown in Table 1.

Comparative Example 3

Single Phase Tie Layer Containing Ethylene Methyl Acrylate

A tie layer was prepared for the adhesion trial as described in Ex. 1 except that ethylene methyl acrylate (melt flow rate=2 dg/min at 190° C./2.16 kg load; density=0.944 g/cm$^3$) was substituted in for the inventive rubber modified vinyl cyanide-containing copolymer/styrenic block copolymer blend. A sample of Korad® acrylate-based cap layer, the ethylene methyl acrylate tie layer, and the Sequel® E-3000 substrate layer were hot pressed, and the adhesion was evaluated as described in Ex. 1. Results are shown in Table 1.

Comparative Example 4

Multicomponent Tie Layer Containing Rubber Modified Polypropylene and Ethylene Methyl Acrylate In an effort to increase the processability of a single phase tie layer, a second component was added. A tie layer containing 60 percent by weight rubber modified polypropylene (melt flow rate=1.1 dg/min at 230° C./2.16 kg load; density=1.07 g/cm$^3$) and 40 percent by weight ethylene methyl acrylate from Comp. Ex. 2 was prepared for the adhesion trial as described in Ex. 1. A sample of Korad® acrylate-based cap layer, the multicomponent tie layer, and the Sequel® E-3000 substrate layer were hot pressed, and the adhesion was evaluated as described in Ex. 1. Results are shown in Table 1. This effort to improve the processability of the tie layer undesirably resulted in a decrease in the adhesion observed in Comp. Ex. 2.

Comparative Example 5

Single Phase Tie Layer Containing Styrenic Block Copolymer

A tie layer was prepared for the adhesion trial as described in Ex. 1 except that maleated styrene/ethylene-butylene/styrene (2.0 percent by weight maleic anhydride) was used in place of the inventive rubber modified vinyl cyanide-containing copolymer/styrenic block copolymer blend. A sample of Korad® acrylate-based cap layer, the tie layer, and the Sequel® E-3000 substrate layer were hot pressed, and the adhesion was evaluated as described in Ex. 1. Results are shown in Table 1.

Comparative Example 6

Multicomponent Tie Layer Containing Styrenic Block Copolymer and Ethylene Methyl Acrylate In an effort to increase the processability of the single phase tie layer, a different second component was added. An tie layer containing 50 percent by weight of the Comp. Ex. 2 tie layer component and 50 percent by weight of the Comp. Ex. 4 tie layer component was prepared for the adhesion trial as described in Ex. 1. A sample of Korad® acrylate-based cap layer, the multicomponent tie layer, and the Sequel® E-3000 substrate layer were hot pressed, and the adhesion was evaluated as described in Ex. 1. Results are shown in Table 1. Undesirably, efforts to improve the processability of the tie layer again resulted in decreased adhesion observed in Comp. Ex. 4.

TABLE 1

| Example | Adhesion to Cap Layer | Adhesion to Substrate Layer |
| --- | --- | --- |
| Ex. 1 | Excellent | Excellent |
| Comp. Ex. 1 | No adhesion | No adhesion |
| Comp. Ex. 2 | Poor | Excellent |
| Comp. Ex. 3 | Good | Excellent |
| Comp. Ex. 4 | Poor | Excellent |
| Comp. Ex. 5 | Good | Excellent |
| Comp. Ex. 6 | Good | Good |

Example 2

A Multilayered Polymeric Structure According to the Invention

During thermoforming trials, the tie layer component according to the invention containing 40 percent by weight rubber modified vinyl cyanide-containing copolymer (melt flow rate=8 dg/min at 220° C./10 kg load; density=1.05 g/cm$^3$) and 60 percent by weight hydrogenated styrene block copolymer (melt flow rate=4.5 dg/min at 230° C./2.16 kg load; density=0.89 g/cm$^3$) was melt blended using a single screw extruder. A sample of the Sequel® E-3000 substrate layer component was melt blended in a second single screw extruder. The tie layer material from the first single screw extruder was then coextruded with the substrate material from the second single screw extruder into a Cloeren 101.6 cm die equipped with a multilayer feedblock design.

As the individual layers exited from the coextrusion die, they were pulled into a Betol vertical three-roll-up stack equipped with 25.4 cm Diathermic oil controlled rolls. A sample of Korad® acrylate-based cap layer was hot laminated onto the surface of the tie/substrate layer structure prior to the composite entering the rolls to form a multilayered polymeric structure. The multilayered structure was pulled through the rolls and conveyed to a cutting station where 90 cm×120 cm sheets were collected. The 90 cm×120 cm sheets were thermoformed using a Comet thermoformer available from MAAC, which was equipped with a 6-zone ceramic heater system and a 30 in Hg 75 gallon vacuum reservoir. Aluminum molds were utilized for the vacuum forming process. The multilayered structure was heated for 160 seconds until the surface of the composite reached approximately 210° C., removed from the oven, and then vacuum formed for 120 seconds using a top-down forming method.

The finished product was then evaluated for typical surface defects such as variation in layer thickness, uneven surface, poor depth perception, sharkskin, and presence of bubbles. No surface defects were observed. Adhesion to both the acrylate-based cap layer and the polyolefin-based substrate layer were rated as excellent. Surprisingly and unexpectedly, the effort to improve the processability of the tie layer resulted in increased adhesion between the acrylate-based cap layer and the tie layer. The multicomponent tie layer showed good high temperature creep resistance during thermoforming, with little or no thinning seen.

Comparative Example 7

Single Phase Tie Layer Containing Styrenic Block Copolymer

A tie layer using the tie layer component of Comp. Ex. 4 was prepared for the thermoforming trial in a single screw extruder as described in Ex. 2. A sample of Sequel® E-3000 was prepared in a separate single screw extruder. The tie layer material was coextruded with the Sequel® material. The observed rheological differences between the tie layer material and the polyolefin-based substrate material resulted in a rough surface with nonuniform thickness. No further processing was attempted.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A multilayered polymeric structure comprising:
   at least one polyolefin-based substrate layer comprising one or more polyolefin materials in a collective amount of at least about 50 weight percent; and
   at least one tie layer comprising at least one vinyl cyanide-containing component and at least one styrenic block copolymer component, wherein the tie layer is present in an amount sufficient to adhesively join at least one additional layer to the at least one substrate layer.

2. The multilayered polymeric structure of claim 1, wherein the at least one additional layer is at least one acrylate-based cap layer comprising from about 50 to 100 weight percent of at least one poly(alkyl(meth)acrylate).

3. The multilayered polymeric structure of claim 2, wherein the at least one vinyl cyanide-containing component is present in an amount from about 1 to 95 weight percent and the at least one styrenic block copolymer component is present in an amount from about 1 to 95 weight percent.

4. The multilayered polymeric structure of claim 3, wherein the at least one vinyl cyanide-containing component comprises at least one polar vinyl monomer present in an amount from about 5 to 85 weight percent, at least one aromatic vinyl comonomer present in an amount from about 10 to 70 weight percent, and at least one rubber moiety present in an amount from about 15 to 90 weight percent.

5. The multilayered polymeric structure of claim 4, wherein the at least one polar vinyl monomer comprises acrylonitrile, methacrylonitrile, or a combination thereof; wherein the at least one aromatic vinyl monomer comprises styrene, p-methylstyrene, o-methylstyrene, ethylstyrene, 2,4-dimethylstyrene, vinylnaphthalene, or a combination thereof; or wherein the at least one rubber moiety comprises one or more ethylene/alpha-olefin copolymers, ethylene/alpha-olefin/nonconjugated diene copolymers, acrylate rubbers, acrylic acid esters, methacrylic acid esters, or a combination thereof, or any blend thereof.

6. The multilayered polymeric structure of claim 1, wherein the at least one vinyl cyanide-containing component comprises one or more ethylene/propylene copolymer-reinforced styrene/acrylonitrile copolymers, ethylene/propylene/nonconjugated diene rubber-reinforced styrene/acrylonitrile copolymers, acrylate rubber-reinforced styrene/acrylonitrile copolymers, methacrylate rubber-reinforced styrene/acrylonitrile copolymers, or a combination thereof.

7. The multilayered polymeric structure of claim 1, wherein the at least one styrenic block copolymer component comprises a styrenic component and a hydrogenated olefinic component.

8. The multilayered polymeric structure of claim 7, wherein the at least one styrenic block copolymer component is selectively hydrogenated, wherein at least about 80% of the double bonds in the hydrogenated olefinic component are hydrogenated, and wherein less than about 65% of the double bonds of the styrenic component are hydrogenated.

9. The multilayered polymeric structure of claim 7, wherein the at least one styrenic block copolymer component comprises styrene-ethylene-butylene, styrene-ethylene-butylene-styrene, styrene-ethylene-propylene-styrene, styrene-butylene-styrene, styrene-ethylene-propylene-styrene-styrene-ethylene-propylene-styrene, or styrene-ethylene-ethylene-propylene-styrene, or a combination thereof.

10. The multilayered polymeric structure of claim 2, wherein the at least one acrylate-based cap layer comprises at least one impact modified poly(alkyl(meth)acrylate) copolymerized with at least one acrylic, acrylate, methacrylic, or methacrylate comonomer, or a combination thereof.

11. The multilayered polymeric structure of claim 1, wherein the at least one polyolefin-based substrate layer comprises at least one $C_2$ to $C_{20}$ alpha-olefin homopolymer, $C_2$ to $C_{20}$ alpha-olefin copolymer, thermoplastic polyolefin composition, or a combination thereof.

12. The multilayered polymeric structure of claim 2, wherein the at least one acrylate-based cap layer, the at least one polyolefin-based substrate layer, and the at least one tie layer each further independently comprises one or more thermal stabilizers, ultraviolet stabilizers, antioxidants, flame retardants, mineral fillers, processing aids, process oils, conductive fillers, nucleating agents, plasticizers, impact modifiers, colorants, mold release agents, lubricants, antistatic agents, pigments, or a combination thereof.

13. A thermoformed article comprising the multilayered polymeric structure of claim 2.

14. A polymeric article comprising the multilayered polymeric structure of claim 2 wherein the at least one acrylate-based cap layer, the at least one polyolefin-based substrate layer, and at least one tie layer are permanently joined.

15. The polymeric article of claim 14 having a thickness of at least about 0.1 mm to about 38 mm.

16. An extruded article comprising the multilayered polymeric structure of claim 2.

17. The multilayered polymeric structure of claim 1 wherein the polyolefin-based substrate layer and the tie layer are coextruded into a planar form.

18. The multilayered polymeric structure of claim 17 wherein the coextruded planar form is laminated sequentially or in line with at least one acrylate-based cap layer.

19. The multilayered structure of claim 2 wherein the acrylate-based cap layer, the tie layer, and the polyolefin-based substrate layer are prepared in separate extruders and subsequently coextruded.

20. A method of forming a multilayered polymeric structure which comprises:
  providing at least one polyolefin-based substrate layer comprising at least one polyolefin in an amount of at least about 50 weight percent and at least one additional layer; and
  interposing a sufficient amount of at least one tie layer comprising at least one vinyl cyanide-containing component and at least one styrenic block copolymer component between the at least one substrate layer and the at least one additional layer so as to join the layers together to form the multilayered polymeric structure.

21. The method of claim 20 wherein the at least one additional layer is at least one acrylate-based cap layer comprising from about 50 to 100 weight percent of at least one poly(alkyl (meth)acrylate).

22. The method of claim 21 wherein the multilayered polymeric structure is thermoformed to provide a polymeric product having characteristics of the at least one cap material and the at least one substrate material.

23. A tie layer composition comprising at least one vinyl cyanide-containing component and at least one styrenic block copolymer component each present in an amount sufficient to permanently adhere at least two polymeric layers to each other when the adhesive composition is disposed therebetween.

* * * * *